United States Patent [19]

Harrel

[11] Patent Number: 5,901,930
[45] Date of Patent: May 11, 1999

[54] CORD STRAIN RELIEF DEVICE FOR REDUCING CUMULATIVE TRAUMA DISORDERS

[76] Inventor: Stephen K. Harrel, 4510 Ridge Rd., Dallas County, Dallas, Tex. 75229

[21] Appl. No.: 08/941,835

[22] Filed: Oct. 1, 1997

[51] Int. Cl.⁶ .................................................... F16L 3/00
[52] U.S. Cl. ............................ 248/51; 248/51; 224/222
[58] Field of Search .......................... 248/51, 52, 205.2; 224/165, 222, 268

[56] References Cited

U.S. PATENT DOCUMENTS

| | | | |
|---|---|---|---|
| 1,164,928 | 12/1915 | Corcoran | 248/51 |
| 2,261,046 | 10/1941 | Anderson | 248/51 |
| 3,809,349 | 5/1974 | Baedke | 248/51 |
| 3,938,720 | 2/1976 | Vela | 224/222 |
| 4,162,754 | 7/1979 | Fleming | 224/222 |
| 5,289,961 | 3/1994 | Levitt et al. | 224/247 |
| 5,727,343 | 3/1998 | Wehner et al. | 248/51 |

*Primary Examiner*—Ramon O. Ramirez
*Assistant Examiner*—Robert Lipcsik
*Attorney, Agent, or Firm*—Sidley & Austin

[57] ABSTRACT

A cord restraining device including a band fastened around the extremity of a user employing a corded, hand-held tool. Fastened to the band is a hook-member through which the cord is loosely suspended. Fastened to the cord is a stop member which, when abutted with the hook member, prevents further movement of the cord. In this manner, a desired length of cord can be suspended by the tool to thereby allow a user to more accurately balance the tool and prevent trauma and other disorders to joints such as the wrist, hand and fingers.

21 Claims, 2 Drawing Sheets

CORD STRAIN RELIEF DEVICE FOR REDUCING CUMULATIVE TRAUMA DISORDERS

TECHNICAL FIELD OF THE INVENTION

The present invention relates in general to methods and apparatus for supporting cords and lines of hand-operated tools, and more particularly to a cord strain relief for power tools, and the like, for reducing the trauma to an operator's arm muscles, joints and tendons due to extended and repeated operation of the tool.

BACKGROUND OF THE INVENTION

In the assembly of goods, the performance of services and in a variety of other areas, the use of corded, hand-operated tools is often required. In the assembly of many consumer and industrial products, workers are often required to utilize hand-held tools powered by electrical energy, air pressure, etc., in order to accomplish the specific assembly operation. In other professional service areas, such as occupied by surgeons, dentists, technicians, assistants, etc., corded power tools are also required to perform operations such as sawing, cleaning, drilling, suctioning, etc. in order to provide the treatment necessary to a patient. Many other fields of endeavor require the use of corded, hand-held power tools.

It has been found that in many instances the strain on the muscles and joints of an operator is not due solely to the weight of the power tool itself, but due to the weight of the cord attached to the power tool. This is especially the case where operators repeatedly utilize corded equipment over extended periods of time. While the corded tool itself can usually be held to balance the weight thereof in the operator's hand, this is not always true with the cord which dangles from the tool. To that end, significant advances have been made to ergonomically design hand-held tools so that the weight of the tool is well-balanced, the hand grip conforms closely to the shape of a human hand, and vibrations are reduced. This has the potential of reducing injuries that may occur over a period of time as a result of repeated trauma or exposure to strain on a worker's fingers, hand or arm. Such type of injuries are known as cumulative trauma disorders (CDTs). Such type of disorders are also referred to as repetitive strain injuries, repetitive motion disorders, over use syndrome, musculoskeletal disorders and work-related disorders. The risk factors attendant with the use of corded hand-held tools is generally related to vibration, repetition and mechanical stress.

Muscle and joint disorders caused by the weight of the cord have not been addressed in any substantial manner. Different from the hand-held tool itself, the cord can present different amounts of pressure or strain, as a function of the amount of cord dangling from the tool and otherwise unsupported. For example, if a portion of the cord from the tool lies on the floor, bench or table, then the higher the tool is elevated for use, more of the cord requires support and represents added weight that must be overcome by the hand, wrist or arm muscles of the operator. In order to circumvent some of these problems, it is known to suspend the cord from the ceiling and to support portions of the cord by springs, and the like. While these techniques provide some degree of assistance, certain situations dictate for a variety of reasons that the cords cannot be suspended from above.

U.S. Pat. No. 1,164,928 by Corcoran discloses a corded hand-held iron, where the cord is plugged into an outlet located at a position above the operator. In order to reduce the weight of the cord, an arm band is utilized, with a loop through which the cord is suspended. Although this concept appears to reduce the effective weight of the cord that must be supported by the person's arm, the cord is nevertheless unconstrained in the loop and can become unbalanced in terms of weight. In U.S. Pat. No. 3,809,349 by Baedke, an arm band and roller arrangement is utilized to engage the cord to facilitate the travel of the cord through the support in correspondence with the movements of the operator's arm. Although the cord is allowed to easily slide back and forth on the arm band roller, there is no way of controlling the amount of cord which the worker's arm must support. U.S. Pat. No. 2,261,046 by Anderson describes an electrical appliance cord holder that forces the cord against the muscles of the worker's arm to thereby prevent movement of the cord in either direction.

From the foregoing, it can be seen that a need exists for a cord strain relief that can control the weight of the cord pulling on the hand-hold tool to thereby control the stress placed on the operator's fingers and wrist. Another need exists for a cord strain relief that is adjustable as to the amount of cord that is suspended and thus supported by the tool. Yet another need exists for a cord strain relief that allows only a desired amount of cord to be suspended and supported by the tool.

SUMMARY OF THE INVENTION

In accordance with the principles and concepts of the invention, disclosed is a cord strain relief that overcomes the shortcomings and disadvantages of the prior art devices and techniques.

In accordance with the preferred embodiment of the invention, the cord strain relief comprises a band attachable around a worker's extremity. The band has a cord retainer attached thereto for loosely retaining and supporting the cord of a hand-held tool. Preferably, the cord retainer is shaped as a hook in which the cord can be easily placed, and thereafter removed. In accordance with an important feature of the invention, a stop is attached to the cord and is of a size that will not pass through the retainer. With this arrangement, the amount of cord suspended between the strain relief and the hand-held tool is adjustable, depending upon where the stop is located on the cord. Importantly, the worker can place the tool in a resting cradle during non-use and continue with other duties without disengaging the cord from the band retainer.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts or elements throughout the views, and in which.

DETAILED DESCRIPTION OF THE INVENTION

Figure 1:
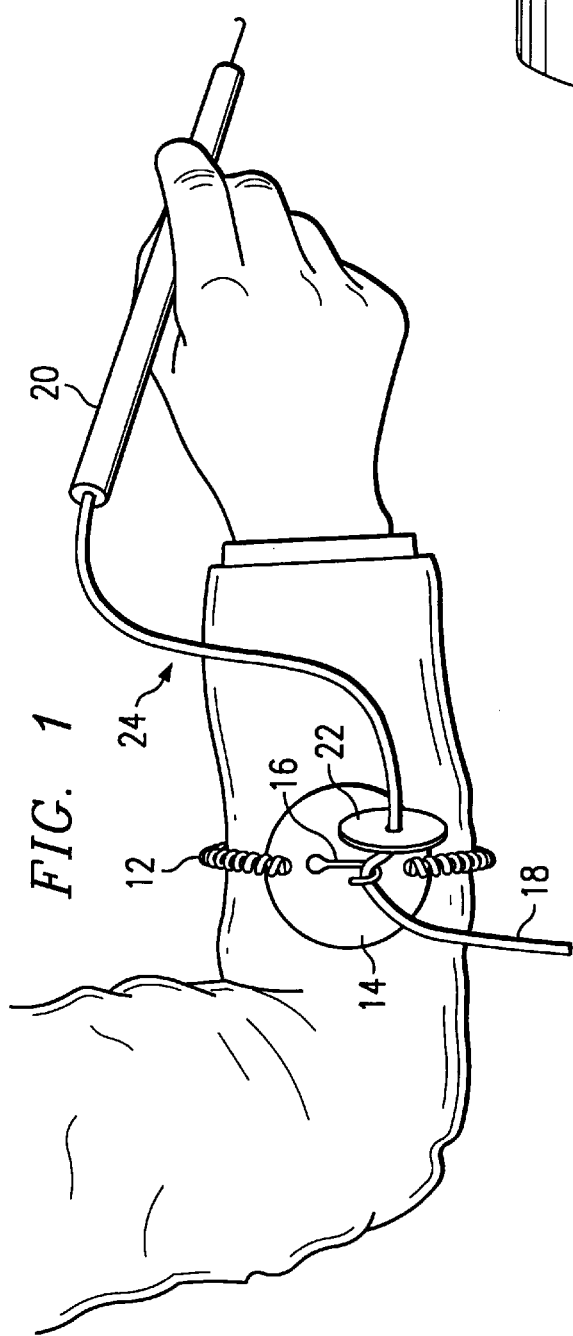
FIG. 1 illustrates the cord strain relief according to a preferred embodiment of the invention, as attached to a worker's forearm.

With reference to FIG. 1, there is illustrated a cord strain relief constructed according to the preferred embodiment of the invention. The cord strain relief includes an arm band 12 that is preferably stretchable or otherwise expandable so as to be firmly engaged around an operator's arm. The arm band 12 comprises a helical coiled plastic strand or filament that can be expanded so as to be placed over the operator's arm, and when released, firmly engages around the arm, sleeve or other wearing apparel. While the arm band 12 is shown as an endless structure, elastic, rubber and other types of endless bands can be utilized. Also, different cloth, plastic, leather and other materials using velcro strips, clips, snaps and buckles can be utilized for attachment to a person's arm. Inasmuch as the invention is described herein as being attached to a user's arm, it can also be attached to another extremity of the user, or to a nearby object.

In the preferred form of the invention, the ends of the arm band 12 are fastened to a plate member 14 to prevent twisting in the event the arm band 12 is adjusted up or down on the operator's arm, or due to movement of the cord 18. The plate member 14 can be constructed of a thin plastic or other type of material with a pair of holes therein through which the ends of the helical strand are threaded and fastened. When utilizing other types of arm bands, and especially those having some substantial width, the plate member 14 can be dispensed with.

Attached to the plate member 14 by a suitable bonding medium is a cord retainer 16. The cord retainer 16 is preferably U-shaped for easy insertion therein of a cord 18. As can be seen in FIG. 1, the cord 18 is connected to a hand-held tool 20 which is illustrated as a dental ultrasonic device. The invention is applicable to power tools that are driven by electrical, suction or air pressure energy; to nonpowered tools which allow air pressure or suction to produce a desired effect, and to many other types of hand-held instruments; all collectively referred to as "tools". As can be appreciated, the cord 18 can simply be placed by the operator within the retainer 16 to support the cord therein. When the cord retainer 16 is suitably fixed to the plate member 14, the retainer 16 remains oriented as shown to allow easy movement of the cord 18 therein.

In accordance with an important feature of the invention, the cord strain relief includes a stop member 22 that is preferably fixed at a desired location on the cord 18. In the preferred embodiment, the stop member 22 is constructed of a plastic or styrofoam material, and is larger than the opening in the cord retainer 16. Equally important, the stop member 22 is placed on the cord 18 between the cord retainer 16 and the hand-held tool 20. In this manner, a desired amount 24 of cord is suspended from the tool 20. Preferably, the amount 24 of cord 18 between the retainer 16 and the tool 20 is utilized to balance the tool 20 in the operator's hand and prevent a continuous muscle tension or strain to maintain the tool 20 in a working position. Stated another way, when the tool 20 is balanced in the operator's hand, the muscle strain is substantially reduced, thereby also lessening the probability of incurring muscle, nerve and other tissue trauma and disorders. The extent 24 of cord suspended between the retainer 16 and the tool 20 is extremely important in maintaining balance of the tool 20 in the operator's hand. By utilizing the stop member 22, the weight of the cord falling to the floor is supported by the operator's forearm, via the stop member 22, and not on the person's wrist, hand or fingers.

A substantial amount of the cord 18 is shown extended toward the floor or in a downwardly direction. As such, the long portion of the cord 18 dangling to the floor maintains the stop member 22 abutted against the cord retainer 16. Hence, the amount 24 of cord between the retainer 16 and the tool 20 is maintained substantially constant.

Figure 2:
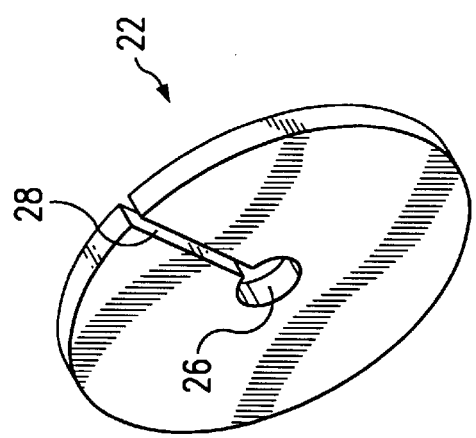
FIG. 2 is an isometric view of a stop member as employed in the invention.

In accordance with another important feature of the invention, the stop member 22 is constructed for clamping to the cord 18, but yet is manually adjustable along the length thereof. Shown in FIG. 2 is the detailed construction of the stop member 22. A hole 26 is formed within the stop member 22, of a diameter somewhat smaller than that of the cord 18. A radial slit 28 can be cut through the stop member 22 from the outer edge thereof to the hole 26. The stop member 22 can thus be easily installed on cords of different sizes and readily clamped thereto. When employed with those types of cords that do not have enlarged ends, the radial cut 28 can be eliminated in the stop member, whereby it can be slipped over the end of the cord to the desired longitudinal location. When the stop member 22 is formed of a styrofoam or other similar type of material, it inherently has a gripping quality that prevents easy movement thereof along the cord 18. Various different shapes and configurations of stop members may be devised by those skilled in the art. In its simplest form, the stop member can be a knot tied in the cord 18.

As noted above, the stop member 22 grips the cord 18. Thus, if the cord twists or rotates, the stop member 22 also rotates. When the rotation of the stop member 22 is undesirable, it can be made in two parts so that a central part that engages with the cord 18 turns with the twisting motion of the cord 18, whereas an outer part of the stop member does not rotate. The center part and the circumferential part of the stop member can be mounted together by an annular groove and ridge arrangement, a bearing, or other structure. With this type of stop member, the cord 18 can freely rotate to prevent binding or coiling of the cord, while the stop member remains stationary in engagement with the cord retainer 16.

As shown in FIG. 1, the weight of the cord 18 extended to the floor must be supported by the operator's arm. However, the arm muscles are better able to withstand the remaining weight of the cord, rather than the wrist or fingers of the operator. Indeed, the arm band can be engaged around the operator's bicep muscles to further reduce any muscle strain. In the event the cords are substantially heavy, as is often the case with heavy hand-held tools, the cord retainer 16 can be fastened to the operator's belt or other band that encircles the operator's waist. Alternatively, in certain situations the cord retainer 16 need not even be attached to the operator, but can be attached to a nearby support stand. In this instance, even though the operator's hand may move the tool 20 with respect to the stationary support stand, the amount 24 of cord suspended from the tool 20 remains substantially constant.

Figure 3:
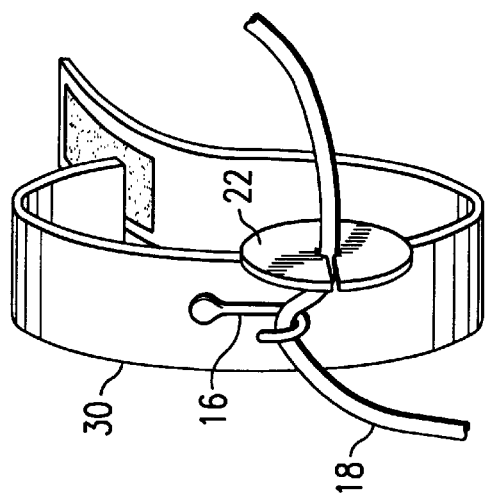
FIG. 3 is an isometric view of another embodiment, in which the cord retainer is fastened directly to an arm band.

FIG. 3 illustrates another embodiment of the invention, in which the cord retainer 16 is fastened directly to a strap-type of arm band 30. The arm band 30 is shown formed with two ends attachable together by way of velcro material, snaps, buckles, or the like. Rather than having two free ends otherwise attachable together, the strap-type of arm band can be constructed as an endless band having elastic or stretchable properties. Because the band 30 can be constructed of cloth, plastic or other woven or nonwoven material having a width of one-half inch or so, the cord retainer 16 does not tend to twist or turn and bind with the cord 18. The cord retainer 16 can be bonded or otherwise fastened to the strap-type arm band 30.

In yet another embodiment of the invention, the stop member 22 can be employed on the cord in conjunction with the arm band such as show in U. S. Pat. No. 1,164,928. In other words, rather than having a hook-shaped cord retainer with an open end, the retainer end can be closed to form a loop. Notwithstanding the particular shape or configuration of the cord retainer, the stop member 22 is effective to prevent the cord 18 from being pulled through the retainer to thereby effectively control the amount 24 of cord suspended from the hand-held tool 20.

Figure 4:
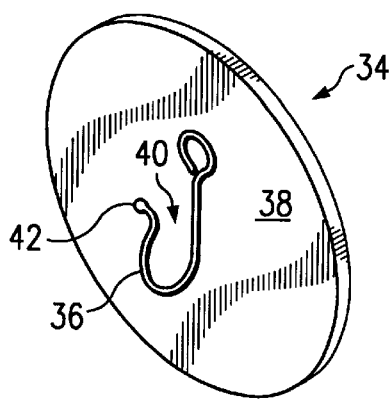
FIG. 4 is an alternative embodiment of a cord retainer.

FIG. 4 illustrates yet another embodiment of a cord retainer 34. Here, the retainer 34 includes a formed wire 36 fastened to a plate member 38. Importantly, the wire 36 is formed somewhat circular, but with only a small opening 40 for entry of the cord. The end 42 of the wire 36 is turned outwardly. Many other different shapes and configurations of the retainer 34 may be devised by those skilled in the art.

Figure 5:
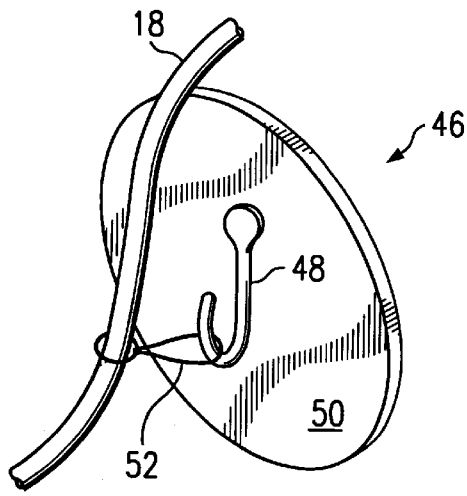
FIG. 5 is an alternative embodiment of a cord retainer.

FIG. 5 illustrates another embodiment of the invention. The cord retainer 46 includes a hook 48 fastened to a plate member 50. Rather than using a disk-shaped stop member, a tether string 52 is simply tied around the cord 18 in a loose manner and looped around the hook 48 of the cord retainer 46. With this arrangement, the cord 18 is prevented from moving a substantial distance with respect to the cord retainer 46, depending upon the length of the loop 52.

Figure 6A:
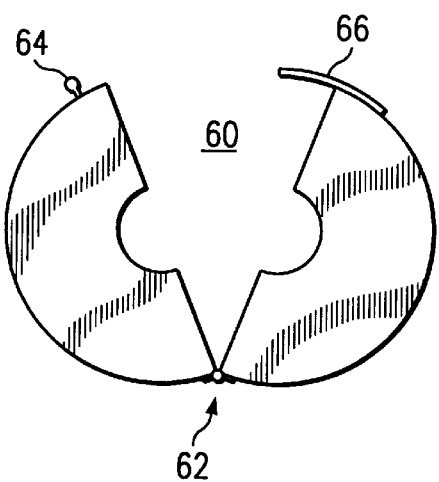
FIGS. 6a and 6b illustrate views of an alternative stop member that can be clamped at different locations to a cord.
Figure 6B:
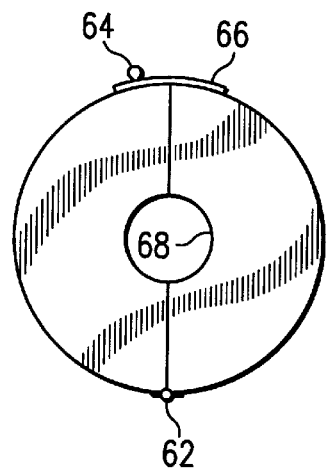

FIGS. 6a and 6b illustrate another embodiment of a stop member 60 that is adapted for clamping to a cord or line. The stop member 60 is molded from a plastic material as two parts, connected together by a living hinge 62. A clasp having a raised part 64 and engaged within a hole (not shown) formed in a flat tab 66 is effective to clamp the stop member 60 halves together. The opening 68 within the retainer is somewhat smaller than the diameter of the cord to which the retainer is clamped. In this manner, the stop member 60 cannot slide along the cord, but yet is adjustable to any position on the cord. As can be appreciated, the stop member 60 is larger than the cord retainer associated therewith.

Figure 7:
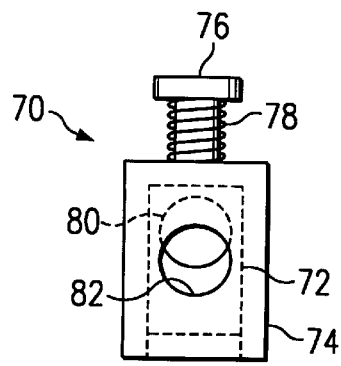
FIG. 7 is a view of yet another stop member that can be clamped to a cord at different locations thereon.

FIG. 7 illustrates yet another embodiment of a stop member 70. This stop member 70 includes a plunger 72 that is slidable within a sleeve 74. The plunger 72 has a finger-operated post 76 that is spring biased upwardly from the sleeve 74 by a spring 78. The plunger 72 has a hole 80 therein. In like manner, the sleeve 74 has a hole 82, the same size as the hole 80. Both holes 80 and 82 are somewhat larger than the cord that is to be supported. When the post 76 is pushed downwardly, the plunger 72 moves down so as to align the hole 80 therein with the hole 82 in the sleeve. When actuated in this manner, the stop member can be moved along the cord to a desired position. When the post 76 is released, the stop member 70 is clamped to the cord. Those skilled in the art may prefer to form the holes slotted to the side so that the stop member 70 can be easily attached to and removed from cord.

The stop members disclosed above are exemplary of the different types that can be employed with the invention. Indeed, many other stop members can be utilized with equal effectiveness. For example, wedge type or spring biased clips of many types can be employed, in a manner similar to standard clothes pins.

From the foregoing, disclosed are methods and apparatus for use with corded, hand-held tools to reduce or eliminate tissue disorders caused by the extended, repetitive and/or vibrational effects of the hand-held tools. In the preferred embodiment of the invention, the cord strain relief maintains a desired amount of cord suspended from the hand-held tool, thereby allowing the operator to more carefully maintain a balance of the tool and thereby relieve tension or stress on the wrist, hand and finger muscles. The stop member of the cord strain relief is adjustable along the cord to thereby adjust the amount, and thus the weight, of the cord suspended from the hand-held tool. As such, the provision of the invention addresses the unsolved problems in hand, wrist and finger tension and trauma occasioned by the use of hand-held tools.

While the present invention has been described above in connection with various embodiments, it is understood that the disclosure has been made by way of example only, as many changes in detail and structure may be made to the invention without departing from the spirit and scope of the invention, as defined by the appended claims.

What is claimed is:

1. A device for supporting a line connected to a tool, comprising:

an anchor structure adapted for fastening to an object;

a line retainer member fastened to said anchor structure, said line retainer member having a passageway through which the line is loosely fittable; and a stop member associated with the line between said anchor structure and the tool, said stop member being larger than said passageway in said retainer member to thereby prevent movement of the line in one direction when said stop member is abutted against said line retainer member and thereby reduce pulling forces exerted by the line on the tool.

2. The device of claim 1, wherein said line retainer member comprises a hook-shaped member for allowing easy removal of the line therefrom.

3. The device of claim 2, wherein said hook-shaped member is deformable to allow removal of the line therefrom.

4. The device of claim 1, wherein said line retainer member is formed integral with said anchor structure.

5. The device of claim 1, further including an expandable band fastened to said anchor structure.

6. The device of claim 5, wherein said expandable band comprises an endless coiled filament.

7. The device of claim 1, wherein said stop member is constructed so as to be adapted to be movably fixed to the line to adjust the amount of line supported between said line retainer member and the tool.

8. The device of claim 1, wherein said stop member is spring biased so as to clamp to the line.

9. The device of claim 1, wherein the object comprises an extremity of a person.

10. A device for supporting a cord connected to a tool, comprising:

a band engageable around an extremity of an operator utilizing the tool;

a cord retainer attached to said band, said cord retainer having an opening for loosely supporting the cord;

a stop member associated with the cord, said stop member being of a size larger than the opening in said cord retainer to prevent movement of the cord through the opening when said stop member is abutted with said cord retainer; and said stop member being constructed so as to be engageable with the cord such that a predefined length of the cord remains between the tool and said cord retainer irrespective of the location of the tool.

11. The device of claim 10, wherein said stop member is adapted for being adjustably clamped at different locations to the cord.

12. The device of claim 10, wherein said stop member is spring biased into a clamping engagement with the cord.

13. The device of claim 10, wherein said band is endless, and is elastically expandable.

14. The device of claim 10, wherein said band has two ends, and means for removably attaching the two ends together.

15. A method of supporting a line of a tool, comprising the steps of:

attaching a device to a user's extremity;

suspending the line in an apertured portion of said device so that the line is movable through the aperture;

moving the tool toward the apertured device to allow the line to move through the aperture in a first direction until stopped by a stop member on the line; and allowing the amount of line between said stop member and the tool to remain fixed when said stop member abuts against said apertured portion of said device.

16. The method of claim 15, further including movably fixing said stop member at a desired location to the line.

17. The method of claim 16, further including fixing said stop member by using a spring biased stop member.

18. The method of claim 15, further including attaching said device to the user's extremity using an elastic-type band.

19. The method of claim 15, further including attaching said stop member to the line at a location between the tool and said device.

20. The method of claim 19, further including attaching said stop member to the line at a location such that a weight of a length of the line between said stop member and the tool facilitates balancing of the tool in the user's hand.

21. The method of claim 15, further including adjusting said stop member at a location on the line to reduce tissue trauma in the user's wrist and hand.

\* \* \* \* \*